United States Patent
Noguchi et al.

(10) Patent No.: US 9,145,962 B2
(45) Date of Patent: Sep. 29, 2015

(54) DRIVE FORCE TRANSMISSION APPARATUS

(71) Applicant: DENSO CORPORATION, Kariya, Aichi-pref. (JP)

(72) Inventors: Hitoshi Noguchi, Handa (JP); Hiroshi Okada, Kariya (JP); Tomohiro Saito, Chiryu (JP); Kazutoshi Nishinakamura, Chiryu (JP); Yoshihiro Yamashita, Anjo (JP); Yousuke Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 13/867,516

(22) Filed: Apr. 22, 2013

(65) Prior Publication Data

US 2013/0276576 A1  Oct. 24, 2013

(30) Foreign Application Priority Data

Apr. 20, 2012 (JP) .................................. 2012-97036

(51) Int. Cl.
*B60K 6/387* (2007.10)
*F16H 37/06* (2006.01)
(Continued)

(52) U.S. Cl.
CPC .............. *F16H 37/065* (2013.01); *B60K 6/387* (2013.01); *B60K 6/40* (2013.01); *B60K 6/442* (2013.01); *Y02T 10/6234* (2013.01); *Y10T 74/19014* (2015.01)

(58) Field of Classification Search
CPC ......... F16H 3/08; F16H 37/065; A01D 69/06; B60K 6/40; B60K 6/387; B60K 6/442
USPC ............ 74/325, 330, 331, 340, 665 A, 665 B, 74/665 F, 665 G, 661; 475/5, 15, 150, 151; 903/909, 946; 180/65.265
See application file for complete search history.

(56) References Cited

U.S. PATENT DOCUMENTS 4,580,458 A * 4/1986 Gott et al. ........................ 74/359
5,243,870 A   9/1993 Hatakeyama
(Continued)

FOREIGN PATENT DOCUMENTS

JP  31-004308   3/1956
JP  62-283240   12/1987

OTHER PUBLICATIONS

Office Action (3 pages) dated Apr. 8, 2014, issued in corresponding Japanese Application No. 2012-097036 and English translation (5 pages).

(Continued)

*Primary Examiner* — William Kelleher
*Assistant Examiner* — Jude Agendia
(74) *Attorney, Agent, or Firm* — Nixon & Vanderhye P.C.

(57) ABSTRACT

A first tubular shaft is placed on a radially outer side of a countershaft. A second tubular shaft is placed on a radially outer side of the first tubular shaft. A first driven gear is provided at one end portion of the first tubular shaft and is meshed with a first drive gear. A second driven gear is provided at one end portion of the second tubular shaft and is meshed with a second drive gear. A second secondary coupling portion is provided at the countershaft. A second primary coupling portion is provided at the other end portion of the first tubular shaft. The second primary coupling portion is engageable with the second secondary coupling portion. A third primary coupling portion is provided at the other end portion of the second tubular shaft. The third primary coupling portion is engageable with the second secondary coupling portion.

8 Claims, 6 Drawing Sheets

(51) Int. Cl.
*B60K 6/40* (2007.10)
*B60K 6/442* (2007.10)

(56) References Cited

U.S. PATENT DOCUMENTS

| | | | | |
|---|---|---|---|---|
| 6,010,422 | A * | 1/2000 | Garnett et al. | 475/5 |
| 7,214,156 | B2 * | 5/2007 | Oliver | 475/8 |
| 7,231,843 | B2 * | 6/2007 | Gumpoltsberger et al. | 74/329 |
| 8,051,732 | B2 * | 11/2011 | Gitt | 74/331 |
| 8,574,120 | B2 * | 11/2013 | Saito et al. | 477/5 |
| 8,731,760 | B2 * | 5/2014 | Nishinakamura et al. | 701/22 |
| 2002/0082134 | A1 | 6/2002 | Hirt et al. | |
| 2012/0006153 | A1 * | 1/2012 | Imamura et al. | 74/665 A |
| 2012/0122623 | A1 * | 5/2012 | Rodgers, II | 475/218 |
| 2012/0208671 | A1 * | 8/2012 | Zhu et al. | 477/5 |

OTHER PUBLICATIONS

Office Action (3 pages) dated Oct. 17, 2014, issued in corresponding Japanese Application No. 2012-097036 and English translation (5 pages).
Office Action issued in JP Appl. No. 2012-097036 (with an English translation), 12 pages.

* cited by examiner

DRIVE FORCE TRANSMISSION APPARATUS

CROSS REFERENCE TO RELATED APPLICATION

This application is based on and incorporates herein by reference Japanese Patent Application No. 2012-97036 filed on Apr. 20, 2012.

TECHNICAL FIELD

The present disclosure relates to a drive force transmission apparatus.

BACKGROUND

A known drive force transmission apparatus installed in a hybrid vehicle (e.g., a hybrid automobile) is configured to transmit a drive force from a plurality of drive sources to a drive device of the vehicle, which drives the vehicle. For example, JP2012-30775A (corresponding to US2012/0006153A1) teaches a drive force transmission apparatus, which is configured to transmit a drive force of an internal combustion engine and a drive force of a motor to a differential gear of a vehicle through an input shaft and an output shaft.

In the drive force transmission apparatus of JP2012-30775A (corresponding to US2012/0006153A1), the number of clutches is reduced while enabling use of a high gear and a low gear by the internal combustion engine and a first motor in a drive force transmission path to reduce a size of the drive force transmission apparatus. In the drive force transmission apparatus of the first embodiment disclosed in JP2012-30775A (corresponding to US2012/0006153A1), the low gear and the high gear are provided to the input shaft, and an input-side clutch is placed between the low gear and the high gear. Furthermore, in this drive force transmission apparatus, the output shaft is placed parallel to the input shaft, and a first output-side clutch and a second output-side clutch are placed one after another in an axial direction of the output shaft. Furthermore, a driven gear, which is meshed with the high gear, is placed on a differential gear side of the first output-side clutch. In addition, a driven gear, which is meshed with the low gear, is placed on a second motor side of the second output-side clutch. As discussed above, in this drive force transmission apparatus, the clutches and the gears are dispersed along the axial direction of the input shaft and the output shaft. Therefore, the length of the input shaft and the length of the output shaft are disadvantageously increased.

In the drive force transmission apparatus of the second embodiment disclosed in JP2012-30775A (corresponding to US2012/0006153A1), a cylindrical tubular input shaft is placed coaxially with the input shaft on a radially outer side of the input shaft, and the low gear is connected to an engine side of the cylindrical tubular shaft. Furthermore, the input-side clutch is placed on a first motor side of the cylindrical tubular input shaft. With this construction, in comparison to the drive force transmission apparatus of the first embodiment disclosed in JP2012-30775A (corresponding to US2012/0006153A1), the length of the input shaft may be further increased. In addition, a dead volume may possibly be formed between the high gear and the low gear.

As discussed above, in these embodiments of JP2012-30775A (corresponding to US2012/0006153A1), the length of the input shaft and the length of the output shaft are relatively long, so that the installability of the drive force transmission apparatus in the vehicle may possibly be deteriorated. Also, a torsion resistance of the input shaft and the output shaft may possibly be deteriorated.

SUMMARY

According to the present disclosure, there is provided a drive force transmission apparatus that is configured to transmit a drive force from first and second drive sources to a drive device of a vehicle, which drives the vehicle. The drive force transmission apparatus includes a first main shaft, a second main shaft, a countershaft, a first drive gear, a second drive gear, a first secondary coupling portion, a first primary coupling portion, a first tubular shaft, a second tubular shaft, a first driven gear, a second driven gear, a second secondary coupling portion, a second primary coupling portion and a third primary coupling portion. The first main shaft has one end portion, which is connected to the first drive source. The second main shaft has one end portion, which is connected to the second drive source. The second main shaft is generally coaxial with the first main shaft. The other end portion of the second main shaft, which is opposite from the one end portion of the second main shaft, is opposed to the other end portion of the first main shaft, which is opposite from the one end portion of the first main shaft. The countershaft has one end portion, which is connected to the drive device. The countershaft is generally parallel to the first main shaft and the second main shaft. The first drive gear is provided at one of the first main shaft and the second main shaft. The second drive gear is connected to the other one of the first main shaft and the second main shaft. The first secondary coupling portion is provided at one of the other end portion of the first main shaft and the other end portion of the second main shaft. The first primary coupling portion is provided at the other one of the other end portion of the first main shaft and the other end portion of the second main shaft. The first primary coupling portion is engageable with the first secondary coupling portion to connect between the first main shaft and the second main shaft. The first tubular shaft is placed on a radially outer side of the countershaft. The first tubular shaft is generally coaxial with the countershaft and is rotatable relative to the countershaft. The second tubular shaft is placed on a radially outer side of the first tubular shaft. The second tubular shaft is generally coaxial with the first tubular shaft and is rotatable relative to the first tubular shaft. The first driven gear is provided at one end portion of the first tubular shaft and is meshed with the first drive gear. The second driven gear is provided at one end portion of the second tubular shaft and is meshed with the second drive gear. The second secondary coupling portion is provided at the countershaft. The second primary coupling portion is provided at the other end portion of the first tubular shaft, which is opposite from the one end portion of the first tubular shaft. The second primary coupling portion is engageable with the second secondary coupling portion to connect between the first tubular shaft and the countershaft. The third primary coupling portion is provided at the other end portion of the second tubular shaft, which is opposite from the one end portion of the second tubular shaft. The third primary coupling portion is engageable with the second secondary coupling portion to connect between the second tubular shaft and the countershaft.

BRIEF DESCRIPTION OF THE DRAWINGS

The drawings described herein are for illustration purposes only and are not intended to limit the scope of the present disclosure in any way.

DETAILED DESCRIPTION

Figure 1:
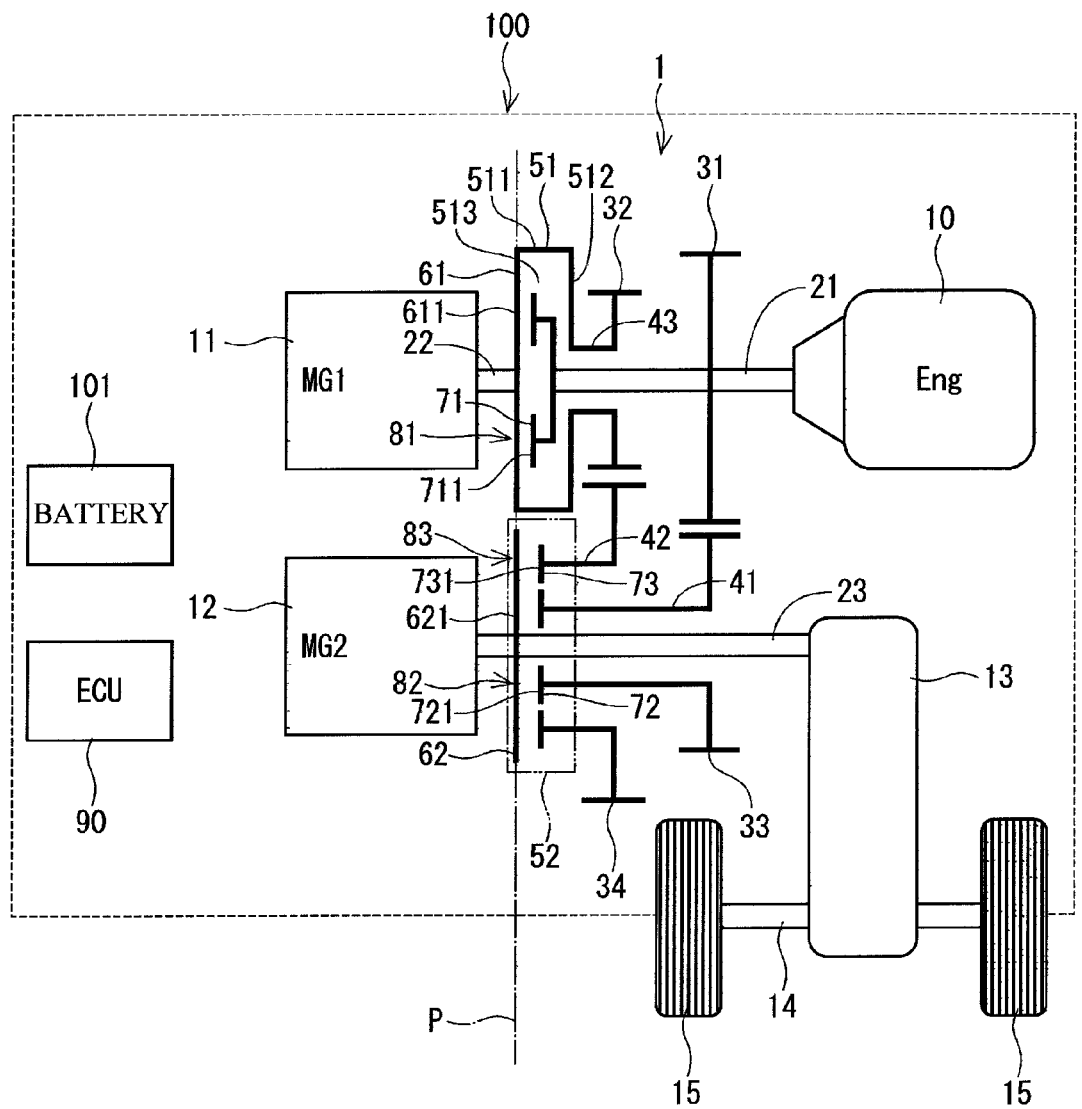
FIG. 1 is a schematic diagram showing a drive force transmission apparatus and a vehicle having the same according to a first embodiment of the present disclosure.

Various embodiments of the present disclosure will be described with reference to the accompanying drawings. Similar components will be indicated by the same reference numerals throughout the following embodiments and will not be described redundantly for the sake of simplicity.

First Embodiment

FIG. 1 shows a drive force transmission apparatus according to a first embodiment of the present disclosure.

The drive force transmission apparatus 1 is installed in a vehicle 100 and is configured to transmit a drive force of an internal combustion engine (serving as a first drive source) 10 and a drive force of a first motor (serving as a second drive source) 11 to a differential gear 13. The engine 10 is a gasoline engine, which is fueled with gasoline. The first motor 11 is an electric motor, which is powered with an electric current supplied from a vehicle drive battery 101 installed in the vehicle 100. The motor 11 also functions as a generator, which generates an electric power and can charge the vehicle drive battery 101 with the generated electric power when a torque is inputted to a motor shaft of the first motor 11. Therefore, the first motor 11 serves as a motor generator. The vehicle 100 is a hybrid vehicle (a hybrid automobile).

The drive force transmission apparatus 1 includes a first main shaft 21, a second main shaft 22, a countershaft 23, a first drive gear 31, a second drive gear 32, a first secondary coupling portion 61, a first primary coupling portion 71, a first tubular shaft 41, a second tubular shaft 42, a first driven gear 33, a second driven gear 34, a second secondary coupling portion 62, a second primary coupling portion 72, a third primary coupling portion 73, a third tubular shaft 43 and a housing 51.

The first main shaft 21 is made of, for example, metal and is configured into a rod form. One end portion of the first main shaft 21 is connected to a crankshaft of the engine 10. Thereby, the drive force of the engine 10 is transmitted to the first main shaft 21.

The second main shaft 22 is made of, for example, metal and is configured into a rod form. One end portion of the second main shaft 22 is connected to the motor shaft of the first motor 11. Thereby, the drive force of the first motor 11 is transmitted to the second main shaft 22. The second main shaft 22 is generally coaxial with the first main shaft 21, and the other end portion of the second main shaft 22, which is opposite from the one end portion of the second main shaft 22, is opposed to the other end portion of the first main shaft 21, which is opposite from the one end portion of the first main shaft 21. That is, the engine 10 and the first motor 11 are installed in the vehicle 100 such that the engine 10 and the first motor 11 are placed along an axis of the first main shaft 21 and an axis of the second main shaft 22. In the present embodiment, a length of the first main shaft 21 is larger than a length of the second main shaft 22.

The countershaft 23 is made of, for example, metal and is configured into a rod form. One end portion of the countershaft 23 is connected to the differential gear 13. In the present embodiment, a second motor (serving as a third drive source) 12 is installed in the vehicle 100. Similar to the first motor 11, the second motor 12 is an electric motor and has a function of a generator. Therefore, the second motor 12 also serves as a motor generator. A motor shaft of the second motor 12 is connected to the other end portion of the countershaft 23, which is opposite from the one end portion of the countershaft 23. Thereby, the drive force of the second motor 12 is transmitted to the differential gear 13 through the countershaft 23. In this instance, the countershaft 23 is generally parallel to the first main shaft 21 and the second main shaft 22.

An axle 14 is provided at the differential gear 13. Two drive wheels 15 are installed to two end portions, respectively, of the axle 14. The drive force, which is transmitted to the countershaft 23, is transmitted to the drive wheels 15 through the differential gear 13 and the axle 14. Thereby, the vehicle 100 is driven to travel. The differential gear 13, the axle 14 and the drive wheels 15 serve as a drive device of the present disclosure.

The first drive gear 31 is made of, for example, metal and is configured into a circular disk form. The first drive gear 31 is provided at a portion of the first main shaft 21, which is adjacent to the engine 10, such that the first drive gear 31 is generally coaxial with the first main shaft 21 and is non-rotatable relative to the first main shaft 21. Thereby, the first drive gear 31 is rotatable integrally with the first main shaft 21. The first drive gear 31 has external teeth.

The third tubular shaft 43 is made of, for example, metal and is configured into a cylindrical tubular form. The third tubular shaft 43 is placed on a radially outer side of the first main shaft 21 such that the third tubular shaft 43 is generally coaxial with the first main shaft 21 and is rotatable relative to the first main shaft 21.

The second drive gear 32 is made of, for example, metal and is configured into an annular form (a circular ring form). The second drive gear 32 is provided at one end portion of the third tubular shaft 43 such that the second drive gear 32 is generally coaxial with the third tubular shaft 43 and is non-rotatable relative to the third tubular shaft 43. Thereby, the second drive gear 32 is rotatable integrally with the third tubular shaft 43. The second drive gear 32 has external teeth. In the present embodiment, an outer diameter of the second drive gear 32 is smaller than an outer diameter of the first drive gear 31. That is, in the present embodiment, the first drive gear 31 is used as a high gear, and the second drive gear 32 is used as a low gear.

The housing 51 is made of, for example, metal and includes a tubular portion 511 and bottom portion 512. The bottom portion 512 closes one end of the tubular portion 511. A through-hole extends through a center of the bottom portion 512. The other end portion of the third tubular shat 43, which is opposite from the one end portion of the third tubular shaft 43, is connected to an inner peripheral edge part of the through-hole of the bottom portion 512. That is, the housing 51 is provided at the other end portion of the third tubular shaft 43 such that the housing 51 is generally coaxial with the third tubular shaft 43 and is non-rotatable relative to the third tubular shaft 43. Thereby, the housing 51 is rotatable integrally with the third tubular shaft 43.

The first secondary coupling portion 61 is configured into a circular disk form. A center part of the first secondary coupling portion 61 is connected to the other end portion of the second main shaft 22. That is, the first secondary coupling portion 61 is provided at the other end portion of the second main shaft 22 such that the first secondary coupling portion 61 is generally coaxial with the second main shaft 22 and is non-rotatable relative to the second main shaft 22. Thereby, the first secondary coupling portion 61 is rotatable integrally with the second main shaft 22.

An outer peripheral edge part of the first secondary coupling portion 61 is connected to the tubular portion 511 of the housing 51 such that the first secondary coupling portion 61 closes the other end portion of the tubular portion 511, which is opposite from the one end portion of the tubular portion 511. The second drive gear 32 is connected to the second main shaft 22 such that the second drive gear 32 is non-rotatable to the second main shaft 22. Thereby, the second main shaft 22, the first secondary coupling portion 61, the housing 51, the third tubular shaft 43 and the second drive gear 32 are integrally rotatable. That is, the drive force of the first motor 11 is transmitted to the second drive gear 32 through the second main shaft 22. A receiving space 513 is defined by the bottom portion 512, the tubular portion 511 and the first secondary coupling portion 61. Furthermore, the first secondary coupling portion 61 has a secondary coupling plate 611, which is configured into an annular plate form (a circular ring plate form).

The first primary coupling portion 71 is provided at the other end portion of the first main shaft 21 such that the first primary coupling portion 71 is received in the housing 51 and is non-rotatable relative to the first main shaft 21. Thereby, the first primary coupling portion 71 is placed in the receiving space 513 and is rotatable integrally with the first main shaft 21. That is, the drive force of the engine 10 is transmitted to the first drive gear 31 and the first primary coupling portion 71 through the first main shaft 21. The first primary coupling portion 71 has a primary coupling plate 711, which is configured into an annular plate form (a circular ring plate form).

The primary coupling plate 711 of the first primary coupling portion 71 is frictionally engageable with the secondary coupling plate 611 of the first secondary coupling portion 61. When the primary coupling plate 711 of the first primary coupling portion 71 is frictionally engaged with the secondary coupling plate 611 of the first secondary coupling portion 61, the first primary coupling portion 71 connects between the first main shaft 21 and the second main shaft 22. In this instance, the first secondary coupling portion 61 and the first primary coupling portion 71 form a first clutch 81. In the present embodiment, the first clutch 81 is a single layer wet clutch.

The first tubular shaft 41 is made of, for example, metal and is configured into a cylindrical tubular form. The first tubular shaft 41 is placed on a radially outer side of the countershaft 23 such that the first tubular shaft 41 is generally coaxial with the countershaft 23 and is rotatable relative to the countershaft 23.

The second tubular shaft 42 is made of, for example, metal and is configured into a cylindrical tubular form. The second tubular shaft 42 is placed on a radially outer side of the first tubular shaft 41 such that the second tubular shaft 42 is generally coaxial with the first tubular shaft 41 and is rotatable relative to the first tubular shaft 41. That is, the first tubular shaft 41 and the second tubular shaft 42 form a duplex tube (a double tube).

The first driven gear 33 is made of, for example, metal and is configured into an annular form (a circular ring form). The first driven gear 33 is provided at one end portion of the first tubular shaft 41 such that the first driven gear 33 is generally coaxial with the first tubular shaft 41 and is non-rotatable relative to the first tubular shaft 41. Thereby, the first driven gear 33 is rotatable integrally with the first tubular shaft 41. The first driven gear 33 has external teeth, which are meshed with the external teeth of the first drive gear 31. Thereby, the first driven gear 33 is rotatable in a rotational direction that is opposite from a rotational direction of the first drive gear 31. In this instance, the first drive gear 31 and the first driven gear 33 form a high gear mechanism.

The second driven gear 34 is made of, for example, metal and is configured into an annular form (a circular ring form). The second driven gear 34 is provided at one end portion of the second tubular shaft 42 such that the second driven gear 34 is generally coaxial with the second tubular shaft 42 and is non-rotatable relative to the second tubular shaft 42. Thereby, the second driven gear 34 is rotatable integrally with the second tubular shaft 42. The second driven gear 34 has external teeth, which are meshed with the external teeth of the second drive gear 32. Thereby, the second driven gear 34 is rotatable in a rotational direction that is opposite from a rotational direction of the second drive gear 32. In this instance, the second drive gear 32 and the second driven gear 34 form a low gear mechanism. A speed reducing ratio of the low gear mechanism is larger than a speed reducing ratio of the high gear mechanism discussed above.

The second secondary coupling portion 62 is provided at a portion of the countershaft 23, which is adjacent to the second motor 12, such that the second secondary coupling portion 62 is generally coaxial with the countershaft 23 and is non-rotatable relative to the countershaft 23. In this way, the second secondary coupling portion 62 is rotatable integrally with the countershaft 23. The second secondary coupling portion 62 has a secondary coupling plate 621, which is configured into an annular plate form (a circular ring plate form). In the present embodiment, the first secondary coupling portion 61 and the second secondary coupling portion 62 are placed along an imaginary plane P, which is generally perpendicular to an axial direction of the first main shaft 21, an axial direction of the second main shaft 22 and an axial direction of the countershaft 23.

The second primary coupling portion 72 is configured into an annular form (a ring form). The second primary coupling portion 72 is provided at the other end portion of the first tubular shaft 41, which is opposite from the one end portion of the first tubular shaft 41, such that the second primary coupling portion 72 is generally coaxial with the first tubular shaft 41 and is non-rotatable relative to the first tubular shaft 41. Thereby, the second primary coupling portion 72 is rotatable integrally with the first tubular shaft 41. That is, the drive force of the engine 10 is transmitted to the second primary coupling portion 72 through the first main shaft 21, the first drive gear 31, the first driven gear 33 and the first tubular shaft 41. The second primary coupling portion 72 has a coupling plate 721, which is configured into an annular plate form (a circular ring plate form).

The coupling plate 721 of the second primary coupling portion 72 is frictionally engageable with one side surface of the secondary coupling plate 621 of the second secondary coupling portion 62. When the coupling plate 721 of the second primary coupling portion 72 is frictionally engaged with the one side surface of the secondary coupling plate 621 of the second secondary coupling portion 62, the second primary coupling portion 72 connects between the first tubular shaft 41 and the countershaft 23. In this instance, the second secondary coupling portion 62 and the second primary coupling portion 72 form a second clutch 82. In the present embodiment, the second clutch 82 is a single layer wet clutch.

The third primary coupling portion 73 is configured into an annular form (a ring form). The third primary coupling portion 73 is provided at the other end portion of the second tubular shaft 42, which is opposite from the one end portion of the second tubular shaft 42, such that the third primary coupling portion 73 is generally coaxial with the second tubular shaft 42 and is non-rotatable relative to the second tubular shaft 42. Thereby, the third primary coupling portion 73 is rotatable integrally with the second tubular shaft 42. That is, the drive force of the first motor 11 can be transmitted to the third primary coupling portion 73 through the second main shaft 22, the first secondary coupling portion 61, the housing 51, the third tubular shaft 43, the second drive gear 32, the second driven gear 34 and the second tubular shaft 42. The third primary coupling portion 73 has a coupling plate 731, which is configured into an annular plate form (a circular ring plate form).

The coupling plate 731 of the third primary coupling portion 73 is frictionally engageable with one side surface of the secondary coupling plate 621 of the second secondary coupling portion 62. When the coupling plate 731 of the third primary coupling portion 73 is frictionally engaged with the one side surface of the secondary coupling plate 621 of the second secondary coupling portion 62, the third primary coupling portion 73 connects between the second tubular shaft 42 and the countershaft 23. In this instance, the second secondary coupling portion 62 and the third primary coupling portion 73 form a third clutch 83. In the present embodiment, the third clutch 83 is a single layer wet clutch.

In the present embodiment, the second secondary coupling portion 62, the second primary coupling portion 72 and the third primary coupling portion 73 are received in a housing 52.

With the above construction, when the second primary coupling portion 72 is engaged with the second secondary coupling portion 62, i.e., when the second clutch 82 is placed in the coupled state (connected state), the drive force of the engine 10 is transmitted to the differential gear 13 through the first main shaft 21, the first drive gear (serving as the high gear) 31, the first driven gear 33, the second primary coupling portion 72, the second secondary coupling portion 62 and the countershaft 23.

When the first primary coupling portion 71 and the second primary coupling portion 72 are engaged with the first secondary coupling portion 61 and the second secondary coupling portion 62, respectively, i.e., when both of the first clutch 81 and the second clutch 82 are placed in the coupled state, the drive force of the first motor 11 is transmitted to the differential gear 13 through the second main shaft 22, the first secondary coupling portion 61, the first primary coupling portion 71, the first main shaft 21, the first drive gear (serving as the high gear) 31, the first driven gear 33, the second primary coupling portion 72, the second secondary coupling portion 62 and the countershaft 23.

When the third primary coupling portion 73 is engaged with the second secondary coupling portion 62, i.e., when the third clutch 83 is placed in the coupled state, the drive force of the first motor 11 is transmitted to the differential gear 13 through the second main shaft 22, the second drive gear (serving as the low gear) 32, the second driven gear 34, the third primary coupling portion 73, the second secondary coupling portion 62 and the countershaft 23.

When the first primary coupling portion 71 and the third primary coupling portion 73 are engaged with the first secondary coupling portion 61 and the second secondary coupling portion 62, respectively, i.e., when both of the first clutch 81 and the third clutch 83 are placed in the coupled state, the drive force of the engine 10 is transmitted to the differential gear 13 through the first main shaft 21, the first primary coupling portion 71, the first secondary coupling portion 61, the second drive gear (serving as the low gear) 32, the second driven gear 34, the third primary coupling portion 73, the second secondary coupling portion 62 and the countershaft 23.

As discussed above, the drive force of the engine 10 and the drive force of the first motor 11 are transmitted to the differential gear 13 through the first drive gear 31 and the first driven gear 33 or the second drive gear 32 and the second driven gear 34 as well as the countershaft 23.

In the present embodiment, an electronic control unit (hereinafter referred to as an ECU) 90 is installed in the vehicle 100.

The ECU 90 is a small computer, which includes a CPU, storage devices (more specifically, a ROM and a RAM) and an input/output device. The ECU 90 integrally controls the vehicle by controlling a drive operation of each of various devices of the vehicle through execution of a corresponding program stored in the ROM based on signals received from various sensors respectively installed to the corresponding portions of the vehicle.

The ECU 90 controls driving/stopping of each of the first and second motors 11-12 and the coupling/decoupling of each of the first to third clutches 81-83 based on the signals received from the sensors to control the transmission path of the rotational drive force generated from the engine 10 and the first motor 11 as well as the speed reducing ratio of the rotational drive force.

More specifically, the ECU 90 receives a vehicle speed signal, which indicates a vehicle speed of the vehicle 100, an accelerator opening degree signal, which corresponds to an accelerator opening degree (corresponding to an amount of depression of an accelerator pedal) and a state of charge (SOC) signal, which corresponds to a charging rate of the vehicle drive battery 101. The vehicle speed signal may be, for instance, a signal, which is outputted from a vehicle speed sensor provided to a wheel of the vehicle. The accelerator opening degree signal may be, for example, a signal, which is outputted from an accelerator opening degree sensor (e.g., an accelerator pedal position sensor). The SOC signal is a signal, which is outputted from a battery monitor device that senses and outputs the charging rate of the vehicle drive battery 101.

The ECU 90 controls the coupling/decoupling of the first to third clutches 81-83 based on the above-described signals. Specifically, the ECU 90 controls an operation of an actuator, which is configured to couple and decouple each corresponding one of the first to third clutches 81-83 (e.g., an actuator that exerts a hydraulic pressure to couple/decouple each corresponding clutch 81-83), to control the coupling/decoupling of the first to third clutches 81-83.

The transmission of the drive force of the first motor 11 to the drive wheels 15 through the second drive gear 32 and the second driven gear 34 (forming the low gear mechanism) and the transmission of the drive force of the first motor 11 to the drive wheels 15 through the first drive gear 31 and the first driven gear 33 (forming the high gear mechanism) are made possible through the control operation of the first to third clutches 81-83 executed by the ECU 90. Also, the transmission of the drive force of the engine 10 to the drive wheels 15 through the high gear mechanism and the transmission of the drive force of the engine 10 to the drive wheels 15 through the low gear mechanism are made possible.

The drive force transmission apparatus 1 is operable in one of a motor L mode, a motor H mode, an engine L mode, an engine H mode and an electric power generating mode discussed below.

In the motor L mode, the drive force of the first motor 11 is transmitted to the drive wheels 15 through the low gear mechanism. In this mode, the third clutch 83 is coupled, and the coupling/decoupling of the other clutches (the first and second clutches 81, 82) may be freely executed depending on a need. However, simultaneous coupling of all of the clutches (the first to third clutches 81-83) does not occur.

In the motor H mode, the drive force of the first motor 11 is transmitted to the drive wheels 15 through the high gear mechanism. In this mode, the first clutch 81 and the second clutch 82 are coupled, and the third clutch 83 is decoupled.

In the engine L mode, the drive force of the engine 10 is transmitted to the drive wheels 15 through the low gear mechanism. In this mode, the first clutch 81 and the third clutch 83 are coupled, and the second clutch 82 is decoupled.

In the engine H mode, the drive force of the engine 10 is transmitted to the drive wheels 15 through the high gear mechanism. In this mode, the second clutch 82 is coupled, and the coupling/decoupling of the other clutches (the first clutch 81 and the third clutch 83) may be freely executed depending on a need. However, simultaneous coupling of all of the clutches (the first to third clutches 81-83) does not occur.

In the electric power generating mode, the drive force of the engine 10 is transmitted to the first motor 11 through the first clutch 81. In this mode, the first clutch 81 is coupled, and the coupling/decoupling of the other clutches (the second clutch 82 and the third clutch 83) may be freely executed depending on a need. In this mode, the electric power is generated at the first motor 11 with the drive force of the engine 10 to charge the electric power in the vehicle drive battery 101. This mode may be executed in a stop state of the vehicle 100. Furthermore, this mode may be executed in a state where the vehicle 100 is traveling at a low speed with the drive force of the second motor 12. Furthermore, it is possible to perform series drive. Specifically, the second motor 12 may be rotated by the electric power, which is generated from the first motor 11, to drive the vehicle 100.

The drive mode (the motor L mode, the motor H mode) of the first motor 11 and the drive mode (the engine L mode, the engine H mode) of the engine 10 may be combined.

Specifically, in a case where both of the first motor 11 and the engine 10 use the low gear mechanism, the motor L mode and the engine L mode may be combined by coupling the first clutch 81 and the third clutch 83 and decoupling the second clutch 82.

Furthermore, in a case where both of the first motor 11 and the engine 10 use the high gear mechanism, the motor H mode and the engine H mode may be combined by coupling the first clutch 81 and the second clutch 82 and decoupling the third clutch 83.

Furthermore, in a case where the first motor 11 uses the low gear mechanism, and the engine 10 uses the high gear mechanism, the motor L mode and the engine H mode may be combined by coupling the second clutch 82 and the third clutch 83 and decoupling the first clutch 81. In this case, different speed reducing ratios can be simultaneously achieved with the first motor 11 and the engine 10. Furthermore, the rotational speed of the countershaft 23 is the same. Thereby, the rotational speed of the first motor 11 can be increased in comparison to the rotational speed of the engine 10. Thus, the high operating point can be selected at the respective drive sources.

However, it should be noted that the first to third clutches 81-83 cannot be controlled to implement the use of the high gear mechanism by the first motor 11 and the use of the low gear mechanism by the engine 10. Here, it should be noted that the situation, in which the high efficiency is achieved through use of the high gear mechanism by the first motor 11, differs from the situation, in which the high efficiency is achieved through use of the low gear mechanism by the engine 10. Therefore, even though these two situations cannot be achieved simultaneously, an influence on the fuel consumption of the vehicle 100 is relatively small.

The ECU 90 can perform a regenerative brake control operation such that the second motor 12 is rotated to generate the electric power by rotating the second motor 12 with the torque transmitted from the drive wheels 15 through the countershaft 23. At this time, when the third clutch 83 is coupled, the torque is transmitted from the drive wheels 15 to the first motor 11 through the countershaft 23 and the second main shaft 22 to generate the electric power at the first motor 11.

The ECU 90 can achieve the appropriate driving of the vehicle 100, which is suitable for the current state of the vehicle 100, through the control operation of the driving/stopping of each of the first and second motors 11-12 in addition to the above-described control operation of the coupling/decoupling of the first to third clutches 81-83.

Therefore, the first motor 11, the second motor 12 and the engine 10 can have the following operational modes through the appropriate combination of the coupling/decoupling of the first to third clutches 81-83 and the appropriate combination of the driving/stopping of the first and second motors 11-12. Specifically, the first motor 11 may have a non-driving mode (i.e., a mode of not transmitting the drive force to the countershaft 23), the motor L mode and the motor H mode. The second motor 12 may have a non-driving mode (i.e., a mode of not transmitting the drive force to the countershaft 23) and a driving mode (a mode of generating a drive force transmitted to the countershaft 23). The engine 10 may have a non-driving mode (i.e., a mode of not transmitting the drive force to the countershaft 23), the engine L mode and the engine H mode. These operational modes of the first motor 11, the second motor 12 and the engine 10 can be freely combined except some combinations.

As discussed above, according to the present embodiment, the following advantages can be achieved.

(1) The first tubular shaft 41 and the second tubular shaft 42 form the duplex tube (the double tube). The second primary coupling portion 72 is provided at the first tubular shaft 41. The third primary coupling portion 73 is provided at the second tubular shaft 42, which is placed on the radially outer side of the first tubular shaft 41. Therefore, the second clutch 82, which includes the second primary coupling portion 72, and the third clutch 83, which includes the third primary coupling portion 73, can be placed adjacent to each other in the axial direction of the countershaft 23. In the present embodiment, the second clutch 82 and the third clutch 83 are received in the one common housing 52. In this way, the axial length of the countershaft 23 can be reduced. Thus, the installability of the drive force transmission apparatus on the vehicle 100 can be improved, and the torsion resistance of the countershaft 23 against the torsion can be improved.

(2) In the present embodiment, the third tubular shaft 43 and the housing 51 are provided to place the second drive gear 32 on the engine 10 side of the first primary coupling portion 71. Thereby, the first primary coupling portion 71 can be placed adjacent to the second primary coupling portion 72 and the third primary coupling portion 73 in the axial direction of the countershaft 23. Therefore, a clutch train, which include the first to third clutches 81-83, is formed in a direction that is generally perpendicular to the axial direction of the countershaft 23. As a result, a sum of the length of the first main shaft 21 and the length of the second main shaft 22 can be reduced to a length that is substantially the same as a length of the countershaft 23. Thus, the torsion resistance of the first main shaft 21 and the second main shaft 22 can be improved, and the installability of the drive force transmission apparatus on the vehicle 100 can be further improved.

(3) In the present embodiment, the second secondary coupling portion 62 has the secondary coupling plate 621, and the second primary coupling portion 72 and the third primary coupling portion 73 are engageable with the one side surface of the secondary coupling plate 621.

(4) In the present embodiment, the first secondary coupling portion 61 and the second secondary coupling portion 62 are placed along the imaginary plane P, which is generally perpendicular to the axial direction of the first main shaft 21, the axial direction of the second main shaft 22 and the axial direction of the countershaft 23. Thereby, the sum of the length of the first main shaft 21 and the length of the second main shaft 22 can be further reduced, and also the length of the countershaft 23 can be further reduced.

(5) In the present embodiment, the second motor 12, which serves as the third drive source, is connected to the other end portion of the countershaft 23, which is opposite from the differential gear 13. In this way, the drive force of the second motor 12 can be transmitted to the differential gear 13 through the countershaft 23.

(6) In the present embodiment, the third primary coupling portion 73 is placed on the radially outer side of the second primary coupling portion 72. Therefore, the engaging surface of the third primary coupling portion 73 (specifically, the engaging surface of the coupling plate 731), which is engaged with the second secondary coupling portion 62, can be increased without a need for a substantial increase in the outer diameter of the third primary coupling portion 73. In the present embodiment, the first drive gear 31 is formed as the high gear, and the second drive gear 32 is formed as the low gear. The third primary coupling portion 73 is connected to the second driven gear 34, which is meshed with the second drive gear 32 that serves as the low gear. Therefore, a large torque is transmitted to the third primary coupling portion 73 from the first motor 11 or the engine 10. Thereby, the increase in the surface area of the coupling plate 731 of the third primary coupling portion 73, which is engageable with the second secondary coupling portion 62, is effective for limiting the unintentional release of the torque and the generation of the heat at the clutch. Furthermore, the increase in the surface area of the coupling plate 731 does not require the substantial increase in the outer diameter of the third primary coupling portion 73. Therefore, it is possible to limit the increase in the size of the third primary coupling portion 73.

(7) Furthermore, in the present embodiment, the clutch train, which includes the first to third clutches 81-83, and the gear train, which includes the first drive gear 31, the first driven gear 33, the second drive gear 32 and the second driven gear 34, can be placed adjacent to each other in an axial direction, which is generally parallel to the axial direction of the first main shaft 21, the axial direction of the second main shaft 22 and the axial direction of the countershaft 23. Thereby, an axial dead volume can be minimized, and the axial size of each shaft 21, 22, 23 can be reduced. As a result, the installability of the drive force transmission apparatus and the torsion resistance of the shaft 21, 22, 23 can be further improved. In the present embodiment, the motor train, which includes the first and second motors 11, 12, can be placed adjacent to the clutch train.

Second Embodiment

Figure 2:
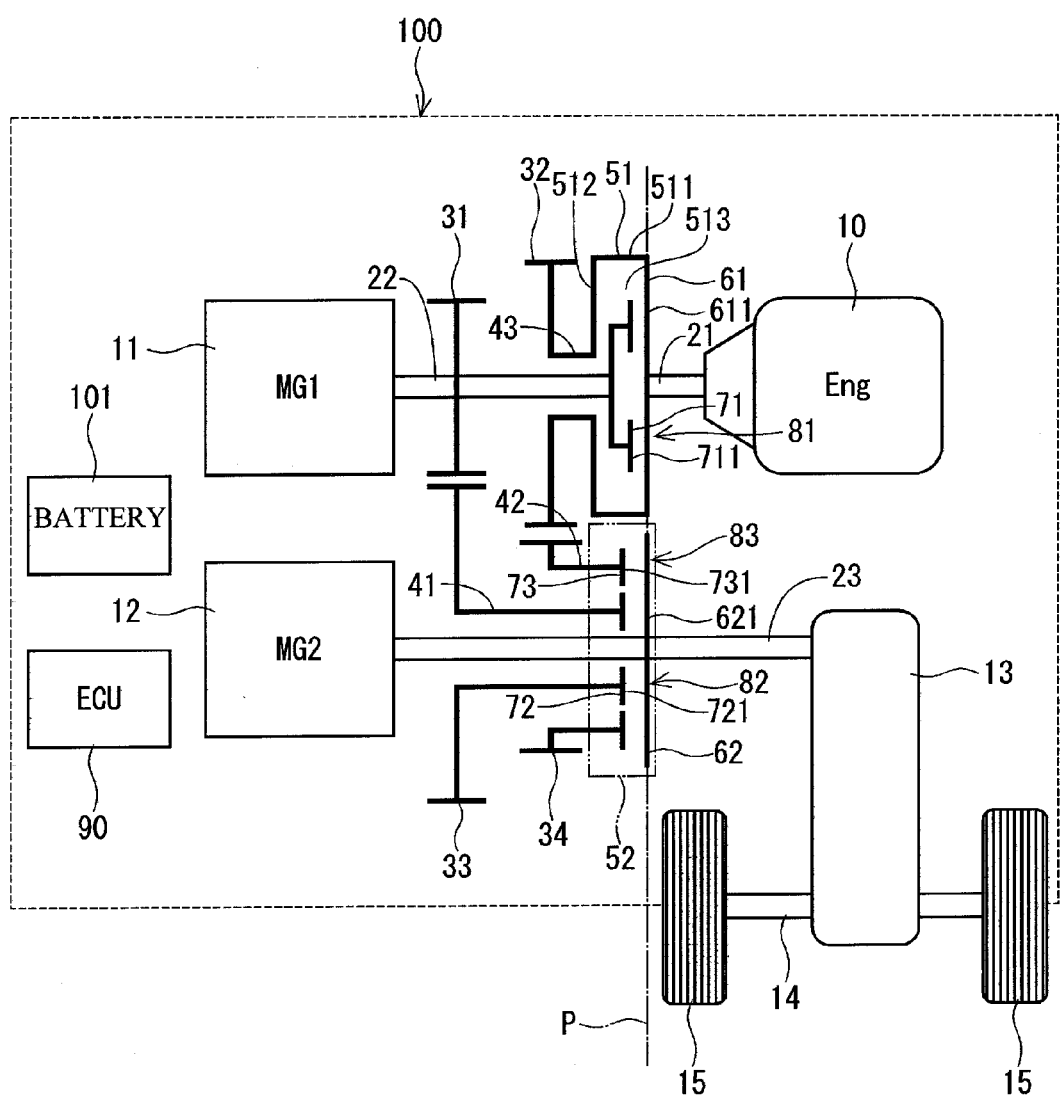
FIG. 2 is a schematic diagram showing a drive force transmission apparatus and a vehicle having the same according to a second embodiment of the present disclosure.

FIG. 2 shows a drive force transmission apparatus according to a second embodiment of the present disclosure. The second embodiment differs from the first embodiment with respect to the arrangement of the corresponding components of the drive force transmission apparatus.

In the second embodiment, the length of the first main shaft 21 is smaller than the length of the second main shaft 22.

The first drive gear 31 is provided at a portion of the second main shaft 22, which is adjacent to the first motor 11, such that the first drive gear 31 is generally coaxial with the second main shaft 22 and is non-rotatable relative to the second main shaft 22. Thereby, the first drive gear 31 is rotatable integrally with the second main shaft 22.

The third tubular shaft 43 is placed on a radially outer side of the second main shaft 22 such that the third tubular shaft 43 is generally coaxial with the second main shaft 22 and is rotatable relative to the second main shaft 22.

The second drive gear 32 is provided at one end portion of the third tubular shaft 43 such that the second drive gear 32 is generally coaxial with the third tubular shaft 43 and is non-rotatable relative to the third tubular shaft 43. Thereby, the second drive gear 32 is rotatable integrally with the third tubular shaft 43. In the present embodiment, the outer diameter of the second drive gear 32 is larger than the outer diameter of the first drive gear 31. That is, in the present embodiment, the first drive gear 31 is used as a low gear, and the second drive gear 32 is used as a high gear.

The other end portion of the third tubular shaft 43 is connected to the inner peripheral edge part of the through-hole of the bottom portion 512. That is, the housing 51 is provided at the other end portion of the third tubular shaft 43 such that the housing 51 is generally coaxial with the third tubular shaft 43 and is non-rotatable relative to the third tubular shaft 43. Thereby, the housing 51 is rotatable integrally with the third tubular shaft 43.

A center part of the first secondary coupling portion 61 is connected to the other end portion of the first main shaft 21. That is, the first secondary coupling portion 61 is provided at the other end portion of the first main shaft 21 such that the first secondary coupling portion 61 is generally coaxial with the first main shaft 21 and is non-rotatable relative to the first main shaft 21. Thereby, the first secondary coupling portion 61 is rotatable integrally with the first main shaft 21.

An outer peripheral edge part of the first secondary coupling portion 61 is connected to the tubular portion 511 of the housing 51 such that the first secondary coupling portion 61 closes the other end portion of the tubular portion 511, which is opposite from the one end portion of the tubular portion 511. That is, the second drive gear 32 is connected to the first main shaft 21 such that the second drive gear 32 is non-rotatable relative to the first main shaft 21. Thereby, the first main shaft 21, the first secondary coupling portion 61, the housing 51, the third tubular shaft 43 and the second drive gear 32 are integrally rotatable. That is, the drive force of the engine 10 is transmitted to the second drive gear 32 through the first main shaft 21.

The first primary coupling portion 71 is provided at the other end portion of the second main shaft 22 such that the first primary coupling portion 71 is received in the housing 51 and is non-rotatable relative to the second main shaft 22. Thereby, the first primary coupling portion 71 is placed in the receiving space 513 and is rotatable integrally with the second main shaft 22. That is, the drive force of the first motor 11 is transmitted to the first drive gear 31 and the first primary coupling portion 71 through the second main shaft 22.

Similar to the first embodiment, the primary coupling plate 711 of the first primary coupling portion 71 is frictionally engageable with the secondary coupling plate 611 of the first secondary coupling portion 61. When the primary coupling plate 711 of the first primary coupling portion 71 is frictionally engaged with the secondary coupling plate 611 of the first secondary coupling portion 61, the first primary coupling portion 71 connects between the first main shaft 21 and the second main shaft 22. In this instance, the first secondary coupling portion 61 and the first primary coupling portion 71 form a first clutch 81.

Similar to the first embodiment, the first tubular shaft 41 is placed on a radially outer side of the countershaft 23 such that the first tubular shaft 41 is generally coaxial with the countershaft 23 and is rotatable relative to the countershaft 23.

Similar to the first embodiment, the second tubular shaft 42 is placed on a radially outer side of the first tubular shaft 41 such that the second tubular shaft 42 is generally coaxial with the first tubular shaft 41 and is rotatable relative to the first tubular shaft 41.

The first driven gear 33 is provided at one end portion of the first tubular shaft 41 such that the first driven gear 33 is generally coaxial with the first tubular shaft 41 and is non-rotatable relative to the first tubular shaft 41. Thereby, the first driven gear 33 is rotatable integrally with the first tubular shaft 41. The external teeth of the first driven gear 33 can be meshed with the external teeth of the first drive gear 31. In this instance, the first drive gear 31 and the first driven gear 33 form a low gear mechanism.

The second driven gear 34 is provided at one end portion of the second tubular shaft 42 such that the second driven gear 34 is generally coaxial with the second tubular shaft 42 and is non-rotatable relative to the second tubular shaft 42. Thereby, the second driven gear 34 is rotatable integrally with the second tubular shaft 42. The external teeth of the second driven gear 34 can be meshed with the external teeth of the second drive gear 32. In this instance, the second drive gear 32 and the second driven gear 34 form a high gear mechanism. A speed reducing ratio of the high gear mechanism is smaller than a speed reducing ratio of the low gear mechanism discussed above.

The second secondary coupling portion 62 is provided at a portion of the countershaft 23, which is adjacent to or closer to the engine 10 side, such that the second secondary coupling portion 62 is generally coaxial with the countershaft 23 and is non-rotatable relative to the countershaft 23. In this way, the second secondary coupling portion 62 is rotatable integrally with the countershaft 23. In the present embodiment, similar to the first embodiment, the first secondary coupling portion 61 and the second secondary coupling portion 62 are placed along the imaginary plane P, which is generally perpendicular to the axial direction of the first main shaft 21, the axial direction of the second main shaft 22 and the axial direction of the countershaft 23.

The second primary coupling portion 72 is provided at the other end portion of the first tubular shaft 41, which is opposite from the one end portion of the first tubular shaft 41, such that the second primary coupling portion 72 is generally coaxial with the first tubular shaft 41 and is non-rotatable relative to the first tubular shaft 41. Thereby, the second primary coupling portion 72 is rotatable integrally with the first tubular shaft 41. That is, the drive force of the first motor 11 can be transmitted to the second primary coupling portion 72 through the second main shaft 22, the first drive gear 31, the first driven gear 33 and the first tubular shaft 41.

Similar to the first embodiment, the coupling plate 721 of the second primary coupling portion 72 is frictionally engageable with the secondary coupling plate 621 of the second secondary coupling portion 62. When the coupling plate 721 of the second primary coupling portion 72 is frictionally engaged with the secondary coupling plate 621 of the second secondary coupling portion 62, the second primary coupling portion 72 connects between the first tubular shaft 41 and the countershaft 23. In this instance, the second secondary coupling portion 62 and the second primary coupling portion 72 form the second clutch 82.

The third primary coupling portion 73 is provided at the other end portion of the second tubular shaft 42, which is opposite from the one end portion of the second tubular shaft 42, such that the third primary coupling portion 73 is generally coaxial with the second tubular shaft 42 and is non-rotatable relative to the second tubular shaft 42. Thereby, the third primary coupling portion 73 is rotatable integrally with the second tubular shaft 42. That is, the drive force of the engine 10 is transmitted to the third primary coupling portion 73 through the first main shaft 21, the first secondary coupling portion 61, the housing 51, the third tubular shaft 43, the second drive gear 32, the second driven gear 34 and the second tubular shaft 42.

Similar to the first embodiment, the coupling plate 731 of the third primary coupling portion 73 is frictionally engageable with the secondary coupling plate 621 of the second secondary coupling portion 62. When the coupling plate 731 of the third primary coupling portion 73 is frictionally engaged with the secondary coupling plate 621 of the second secondary coupling portion 62, the third primary coupling portion 73 connects between the second tubular shaft 42 and the countershaft 23. In this instance, the second secondary coupling portion 62 and the third primary coupling portion 73 form the third clutch 83.

The second secondary coupling portion 62, the second primary coupling portion 72 and the third primary coupling portion 73 are received in the housing 52.

As discussed above, in the second embodiment, the components of the drive force transmission apparatus, which are other than the first main shaft 21, the second main shaft 22 and the countershaft 23, are arranged symmetrically about an imaginary straight line, which is generally perpendicular to the axial direction of the first main shaft 21, the axial direction of the second main shaft 22 and the axial direction of the countershaft 23.

With the above construction, when the third primary coupling portion 73 is engaged with the second secondary coupling portion 62, i.e., when the third clutch 83 is placed in the coupled state, the drive force of the engine 10 is transmitted to the differential gear 13 through the first main shaft 21, the second drive gear (serving as the high gear) 32, the second driven gear 34, the third primary coupling portion 73, the second secondary coupling portion 62 and the countershaft 23.

When the first primary coupling portion 71 and the third primary coupling portion 73 are engaged with the first secondary coupling portion 61 and the second secondary coupling portion 62, respectively, i.e., when both of the first clutch 81 and the third clutch 83 are placed in the coupled state, the drive force of the first motor 11 is transmitted to the differential gear 13 through the second main shaft 22, the first primary coupling portion 71, the first secondary coupling portion 61, the second drive gear (serving as the high gear) 32, the second driven gear 34, the third primary coupling portion 73, the second secondary coupling portion 62 and the countershaft 23.

When the second primary coupling portion 72 is engaged with the second secondary coupling portion 62, i.e., when the second clutch 82 is placed in the coupled state, the drive force of the first motor 11 is transmitted to the differential gear 13 through the second main shaft 22, the first drive gear (serving as the low gear) 31, the first driven gear 33, the second primary coupling portion 72, the second secondary coupling portion 62 and the countershaft 23.

When the first primary coupling portion 71 and the second primary coupling portion 72 are engaged with the first secondary coupling portion 61 and the second secondary coupling portion 62, respectively, i.e., when both of the first clutch 81 and the second clutch 82 are placed in the coupled state, the drive force of the engine 10 is transmitted to the differential gear 13 through the first main shaft 21, the first secondary coupling portion 61, the first primary coupling portion 71, the second main shaft 22, the first drive gear (serving as the low gear) 31, the first driven gear 33, the second primary coupling portion 72, the second secondary coupling portion 62 and the countershaft 23.

As discussed above, the drive force of the engine 10 and the drive force of the first motor 11 can be transmitted to the differential gear 13 through the first drive gear 31 and the first driven gear 33 or the second drive gear 32 and the second driven gear 34 as well as the countershaft 23.

In the second embodiment, although the arrangement of the components are different from that of the first embodiment, the advantages, which are similar to the first embodiment, can be achieved.

Third Embodiment

Figure 3:
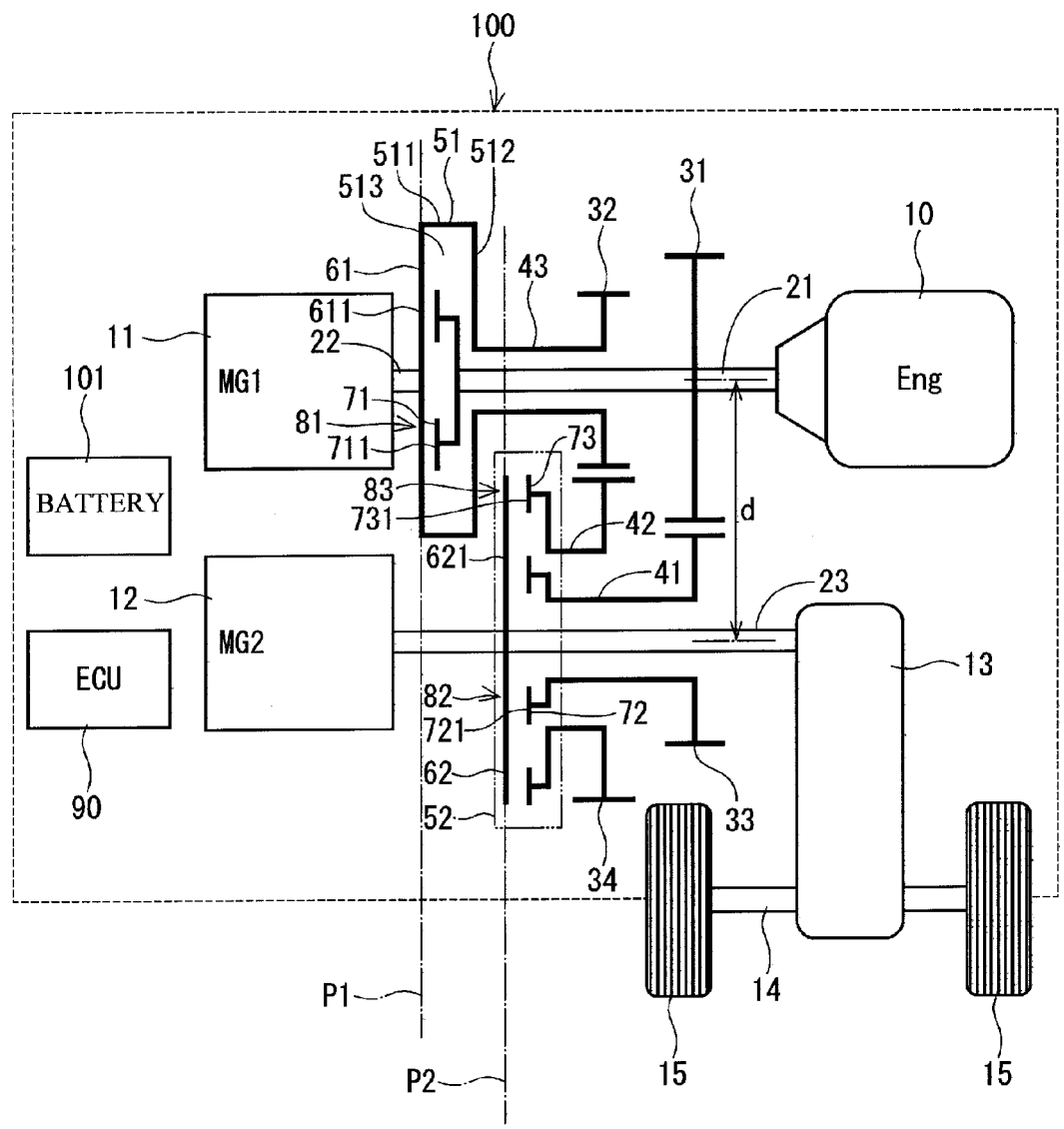
FIG. 3 is a schematic diagram showing a drive force transmission apparatus and a vehicle having the same according to a third embodiment of the present disclosure.

FIG. 3 shows a drive force transmission apparatus according to a third embodiment of the present disclosure. The third embodiment differs from the first embodiment with respect to the arrangement and the sizes of the corresponding components of the drive force transmission apparatus.

In the third embodiment, the first secondary coupling portion 61 and the second secondary coupling portion 62 are placed along two imaginary planes P1, P2, respectively, which are generally perpendicular to the axial direction of the first main shaft 21, the axial direction of the second main shaft 22 and the axial direction of the countershaft 23.

With the above construction, in the third embodiment, the housing 51, which receives the first primary coupling portion 71, and the housing 52, which receives the second primary coupling portion 72 and the third primary coupling portion 73, are displaced from each other in an axial direction, which is generally parallel to the axial direction of the first main shaft 21, the axial direction of the second main shaft 22 and the axial direction of the countershaft 23. Therefore, in comparison to the first embodiment, the outer diameter of the second secondary coupling portion 62, the outer diameter of the second primary coupling portion 72 and the outer diameter of the third primary coupling portion 73 can be increased. Thereby, the surface area of the second primary coupling portion 72 and the surface area of the third primary coupling portion 73 can be increased to limit the unintentional release of the torque and the generation of the heat at the clutch.

With the above construction, according to the third embodiment, in comparison to the first embodiment, a distance (an axis-to-axis distance) d from the first main shaft 21 and the second main shaft 22 to the countershaft 23 can be reduced or minimized. In this way, the size of the drive force transmission apparatus measured in the direction, which is generally perpendicular to the axial direction of the first main shaft 21, the axial direction of the second main shaft 22 and the axial direction of the countershaft 23, can be reduced or minimized.

Fourth Embodiment

Figure 4:
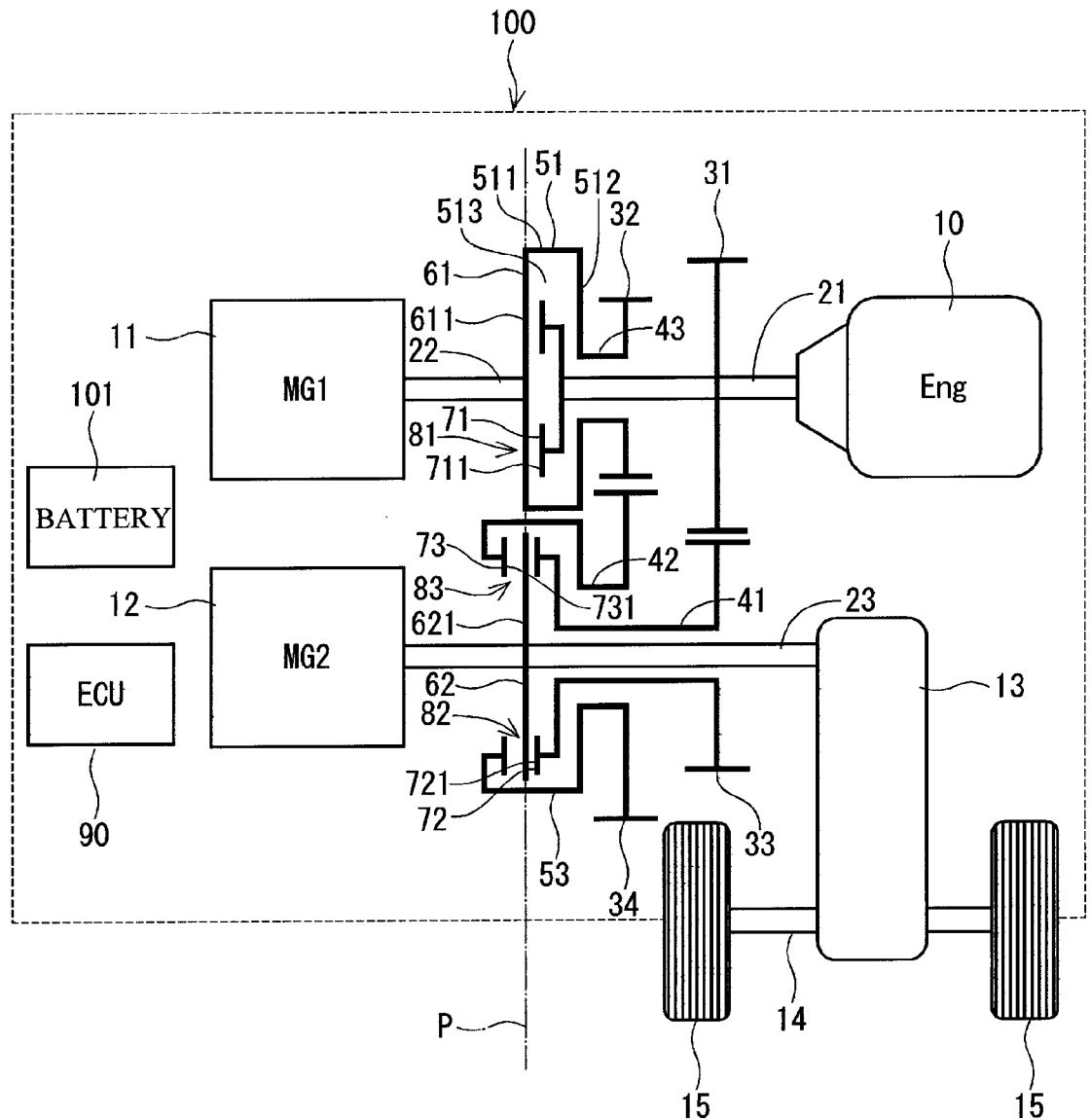
FIG. 4 is a schematic diagram showing a drive force transmission apparatus and a vehicle having the same according to a fourth embodiment of the present disclosure.

FIG. 4 shows a drive force transmission apparatus according to a fourth embodiment of the present disclosure. In the fourth embodiment, the arrangement of the third primary coupling portion differs from that of the first embodiment.

In the fourth embodiment, a housing 53 is provided in place of the housing 52. The housing 53 is provided at the other end portion of the second tubular shaft 42 such that the housing 53 is non-rotatable to the second tubular shaft 42. In this instance, the third primary coupling portion 73 is provided at the side of the housing 53, which is opposite from the second tubular shaft 42, such that the third primary coupling portion 73 is non-rotatable relative to the housing 53. The coupling plate 731 of the third primary coupling portion 73 is engageable with the other side surface of the secondary coupling plate 621 of the second secondary coupling portion 62, i.e., is engageable with the second motor 12 side surface of the secondary coupling plate 621 of the second secondary coupling portion 62.

Similar to the first embodiment, the coupling plate 721 of the second primary coupling portion 72 is engageable with the one side surface of the secondary coupling plate 621 of the second secondary coupling portion 62, i.e., is engageable with the differential gear 13 side surface of the secondary coupling plate 621 of the second secondary coupling portion 62. In the present embodiment, an outer diameter and a surface area of the coupling plate 721 of the second primary coupling portion 72 are larger than those of the first embodiment.

The housing 53 receives the second primary coupling portion 72, the second secondary coupling portion 62 and the third primary coupling portion 73.

In the present embodiment, similar to the first embodiment, the first secondary coupling portion 61 and the second secondary coupling portion 62 are placed along the imaginary plane P, which is generally perpendicular to the axial direction of the first main shaft 21, the axial direction of the second main shaft 22 and the axial direction of the countershaft 23.

Fifth Embodiment

Figure 5:
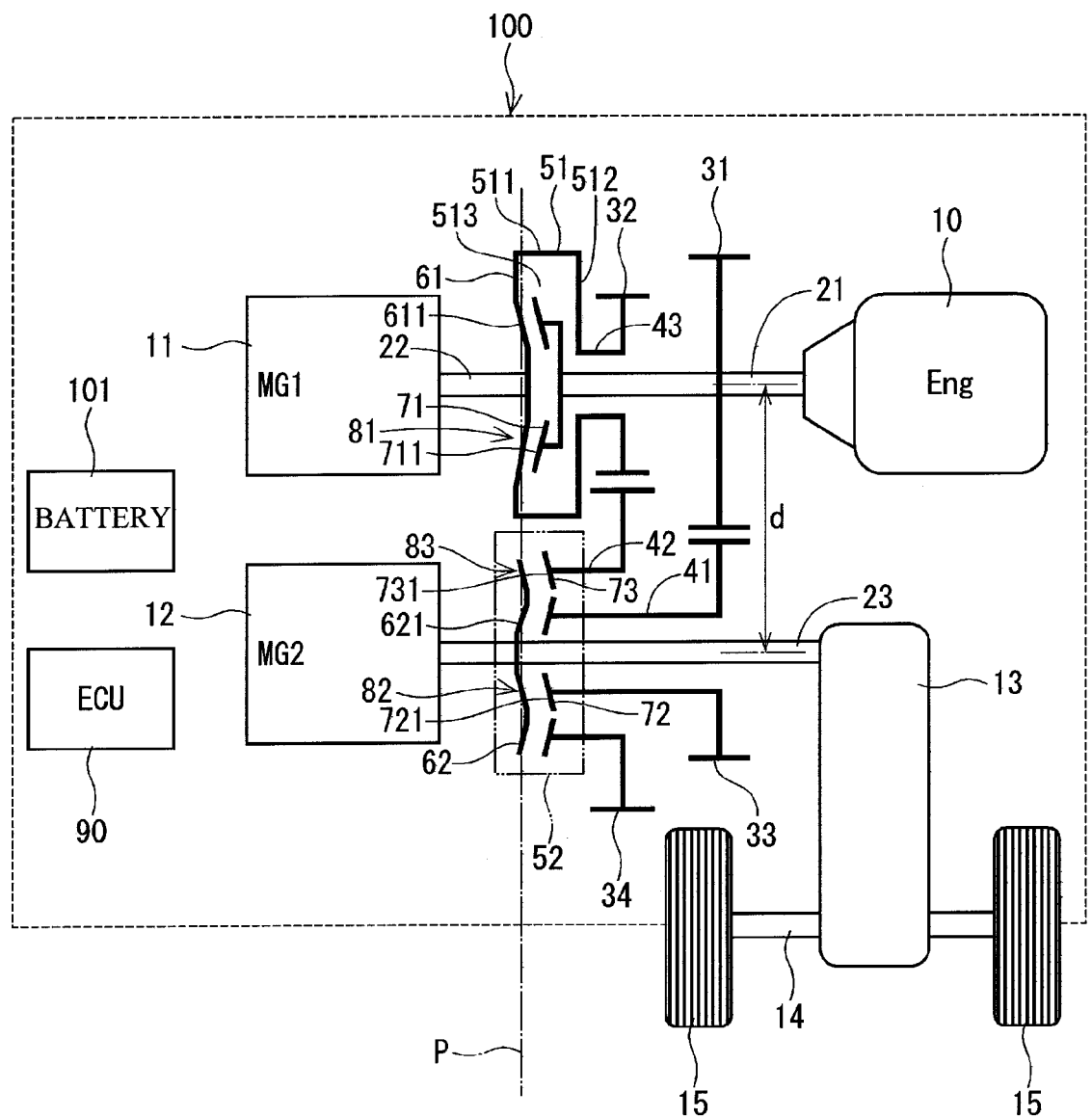
FIG. 5 is a schematic diagram showing a drive force transmission apparatus and a vehicle having the same according to a fifth embodiment of the present disclosure.

FIG. 5 shows a drive force transmission apparatus according to a fifth embodiment of the present disclosure. In the fifth embodiment, the shapes of the first primary coupling portion, the second primary coupling portion and the third primary coupling portion differ from those of the first embodiment.

In the fifth embodiment, an engaging surface of the primary coupling plate 711 of the first primary coupling portion 71, which is engageable with the first secondary coupling portion 61 (more specifically the secondary coupling plate 611), is tapered. The secondary coupling plate 611 of the first secondary coupling portion 61 is configured into the shape, which corresponds to the shape of the primary coupling plate 711.

Furthermore, an engaging surface of the coupling plate 721 of the second primary coupling portion 72 and an engaging surface of the coupling plate 731 of the third primary coupling portion 73, which are engageable with the second secondary coupling portion 62 (more specifically the secondary coupling plate 621), are tapered. The secondary coupling plate 621 of the second secondary coupling portion 62 is configured into the shape, which corresponds to the shape of the coupling plate 721 and the shape of the coupling plate 731.

With the above construction, according to the present embodiment, the outer diameter of the primary coupling plate 711, the outer diameter of the coupling plate 721 and the outer diameter of the coupling plate 731 can be reduced without reducing the surface area of the primary coupling plate 711, the surface area of the coupling plate 721 and the surface area of the coupling plate 731. Thereby, while maintaining the advantage of limiting the unintentional release of the torque and the generation of the heat at the clutch, the radial size of the first primary coupling portion 71, the radial size of the second primary coupling portion 72 and the radial size of the third primary coupling portion 73 can be reduced or minimized. Therefore, in the fifth embodiment, in comparison to the first embodiment, the distance d from the first main shaft 21 and the second main shaft 22 to the countershaft 23 can be reduced or minimized. In this way, the size of the drive force transmission apparatus measured in the direction, which is generally perpendicular to the axial direction of the first main shaft 21, the axial direction of the second main shaft 22 and the axial direction of the countershaft 23, can be reduced or minimized.

Sixth Embodiment

Figure 6:
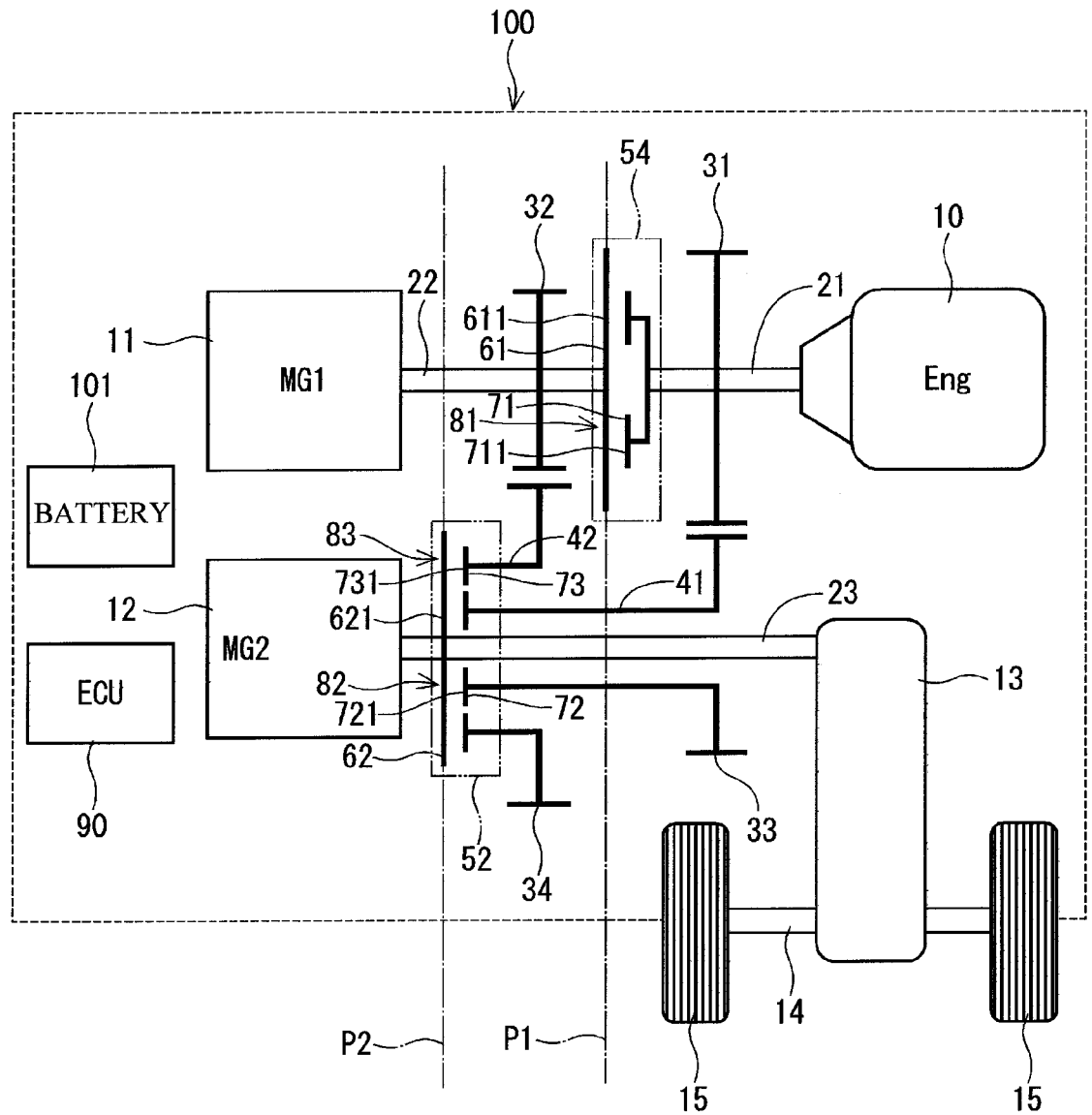
FIG. 6 is a schematic diagram showing a drive force transmission apparatus and a vehicle having the same according to a sixth embodiment of the present disclosure.

FIG. 6 shows a drive force transmission apparatus according to a sixth embodiment of the present disclosure. In the sixth embodiment, the arrangement of the second drive gear, the first secondary coupling portion and the first primary coupling portion differ from those of the first embodiment.

In the sixth embodiment, the second drive gear 32 is made of metal and is configured into a circular disk form. The second drive gear 32 is provided at an axial intermediate portion of the second main shaft 22 such that the second drive gear 32 is generally coaxial with the second main shaft 22 and is non-rotatable relative to the second main shaft 22.

Similar to the first embodiment, the first secondary coupling portion 61 is provided at the other end portion of the second main shaft 22 such that the first secondary coupling portion 61 is generally coaxial with the second main shaft 22 and is non-rotatable relative to the second main shaft 22. Furthermore, similar to the first embodiment, the first primary coupling portion 71 is provided to the other end portion of the first main shaft 21 such that the first primary coupling portion 71 is non-rotatable relative to the first main shaft 21.

In the present embodiment, a housing 54 is provided in place of the housing 51. The housing 54 receives the first secondary coupling portion 61 and the first primary coupling portion 71.

In the sixth embodiment, the first secondary coupling portion 61 and the second secondary coupling portion 62 are placed along two imaginary planes P1, P2, respectively, which are generally perpendicular to the axial direction of the first main shaft 21, the axial direction of the second main shaft 22 and the axial direction of the countershaft 23.

As discussed above, in the present embodiment, the third tubular shaft 43, which is discussed in the first embodiment, is eliminated. Therefore, the first clutch 81, which include the first secondary coupling portion 61 and the first primary coupling portion 71, is axially placed between the first drive gear 31 and the second drive gear 32. In this way, the length of the first main shaft 21, the length of the second main shaft 22 and the length of the countershaft 23 may possibly be increased in comparison to those of the first embodiment. However, in the present embodiment, similar to the first embodiment, the first tubular shaft 41 and the second tubular shaft 42 are provided, and the arrangement of the second secondary coupling portion 62, the second primary coupling portion 72 and the third primary coupling portion 73 is elaborately set to receive the second clutch 82 and the third clutch 83 in the one common housing 52. Thereby, the advantage of reducing the length of the countershaft 23 is achieved.

Now, modifications of the above embodiments will be described.

In the first and third to sixth embodiments, the first drive gear is formed as the high gear, and the second drive gear is formed as the low gear. Furthermore, in the second embodiment, the first drive gear is formed as the low gear, and the second drive gear is formed as the high gear. Alternatively, in one modification of the above embodiments, a gear ratio between the first drive gear and the second drive gear may be freely set.

In the fifth embodiment, the engaging surface of the first primary coupling portion, the engaging surface of the second primary coupling portion and the engaging surface of the third primary coupling portion, which are engaged with the first secondary coupling portion or the second secondary coupling portion, are tapered. In a modification of the fifth embodiment, only one or two of the engaging surface of the first primary coupling portion, the engaging surface of the second primary coupling portion and the engaging surface of the third primary coupling portion, which are engaged with the first secondary coupling portion or the second secondary coupling portion, may be tapered.

In the above embodiments, the first clutch, the second clutch and the third clutch are formed as the single layer wet clutches, respectively. Alternatively, in a modification of the above embodiments, the first clutch, the second clutch and the third clutch may be modified to a dry clutch or a dog clutch of, for example, a synchro-mechanism. Furthermore, each of the first secondary coupling portion and the second secondary coupling portion may have a plurality of secondary coupling plates, and each of the first primary coupling portion, the second primary engaging portion and the third primary engaging portion may have a plurality of primary coupling plates. In this way, each of the first clutch, the second clutch and the third clutch may be formed as a multi-layer clutch.

In the above embodiments, the engine is used as the first drive source, and the motor is used as the second drive source. In a modification of the above embodiments, each of the first drive source, the second drive source and the third drive source may be implemented by any one of the engine and the motor. Also, any one or more of the first drive source, the second drive source and the third drive source may be implemented by any other type of drive source, which can output a rotational torque.

In the above embodiments, the second motor is installed in the vehicle as the third drive source besides the engine (serving as the first drive source) and the first motor (serving as the second drive source). The second motor is connected to the other end portion of the countershaft, i.e., the end portion of the countershaft, which is opposite from the differential gear. In a modification of the above embodiments, the second motor may be eliminated from the vehicle, and the other end portion of the countershaft may be supported by a bearing.

As discussed above, the present disclosure is not limited to the above embodiments, and the above embodiments may be modified within the spirit and scope of the present disclosure.

What is claimed is:

1. A drive force transmission apparatus that is configured to transmit a drive force from first and second drive sources to a drive device of a vehicle, which drives the vehicle, the drive force transmission apparatus comprising:
    a first main shaft that has one end portion, which is connected to the first drive source;
    a second main shaft that has one end portion, which is connected to the second drive source, wherein the second main shaft is generally coaxial with the first main shaft, and the other end portion of the second main shaft, which is opposite from the one end portion of the second main shaft, is opposed to the other end portion of the first main shaft, which is opposite from the one end portion of the first main shaft;
    a countershaft that has one end portion, which is connected to the drive device, wherein the countershaft is generally parallel to the first main shaft and the second main shaft;
    a first drive gear that is provided at one of the first main shaft and the second main shaft;
    a second drive gear that is connected to the other one of the first main shaft and the second main shaft;
    a first secondary coupling portion that is provided at one of the other end portion of the first main shaft and the other end portion of the second main shaft;
    a first primary coupling portion that is provided at the other one of the other end portion of the first main shaft and the other end portion of the second main shaft, wherein the first primary coupling portion is engageable with the first secondary coupling portion to connect between the first main shaft and the second main shaft;
    a first tubular shaft that is placed on a radially outer side of the countershaft, wherein the first tubular shaft is generally coaxial with the countershaft and is rotatable relative to the countershaft;
    a second tubular shaft that is placed on a radially outer side of the first tubular shaft, wherein the second tubular shaft is generally coaxial with the first tubular shaft and is rotatable relative to the first tubular shaft;
    a first driven gear that is provided at one end portion of the first tubular shaft and is meshed with the first drive gear;
    a second driven gear that is provided at one end portion of the second tubular shaft and is meshed with the second drive gear;
    a second secondary coupling portion that is provided at the countershaft;
    a second primary coupling portion that is provided at the other end portion of the first tubular shaft, which is opposite from the one end portion of the first tubular shaft, wherein the second primary coupling portion is engageable with the second secondary coupling portion to connect between the first tubular shaft and the countershaft; and
    a third primary coupling portion that is provided at the other end portion of the second tubular shaft, which is opposite from the one end portion of the second tubular shaft, wherein the third primary coupling portion is engageable with the second secondary coupling portion to connect between the second tubular shaft and the countershaft; and
    the second primary coupling portion and the third primary coupling portion are simultaneously engageable with the second secondary coupling portion, when the countershaft rotates.

2. The drive force transmission apparatus according to claim 1, further comprising:
    a third tubular shaft that has one end portion, which is connected to the second drive gear, wherein the third tubular shaft is placed on a radially outer side of the one of the first main shaft and the second main shaft, and the third tubular shaft is generally coaxial with the one of the first main shaft and the second main shaft and is rotatable relative to the one of the first main shaft and the second main shaft; and
    a housing that connects between the other end portion of the third tubular shaft, which is opposite from the one end portion of the third tubular shaft, and the first secondary coupling portion to connect between the second drive gear and the other one of the first main shaft and the second main shaft, wherein the housing receives the first primary coupling portion at a location between the housing and the first secondary coupling portion.

3. The drive force transmission apparatus according to claim 1, wherein:
    the second secondary coupling portion includes a secondary coupling plate; and
    the second primary coupling portion and the third primary coupling portion are engageable with one side surface of the secondary coupling plate.

4. The drive force transmission apparatus according to claim 1, wherein:
    the second secondary coupling portion includes a secondary coupling plate;
    the second primary coupling portion is engageable with one side surface of the secondary coupling plate; and
    the third primary coupling portion is engageable with the other side surface of the secondary coupling plate, which is opposite from the one side surface of the secondary coupling plate.

5. The drive force transmission apparatus according to claim 2, wherein the first secondary coupling portion and the second secondary coupling portion are placed along an imaginary plane, which is generally perpendicular to an axial direction of the first main shaft, an axial direction of the second main shaft and an axial direction of the countershaft.

6. The drive force transmission apparatus according to claim 1, wherein the first secondary coupling portion and the second secondary coupling portion are placed along two imaginary planes, respectively, which are generally perpendicular to an axial direction of the first main shaft, an axial direction of the second main shaft and an axial direction of the countershaft.

7. The drive force transmission apparatus according to claim 1, wherein at least one of the first primary coupling portion, the second primary coupling portion and the third primary coupling portion has an engaging surface, which is tapered and is engageable with a corresponding one of the first secondary coupling portion and the second secondary coupling portion.

8. The drive force transmission apparatus according to claim 1, wherein a third drive source is connected to the other end portion of the countershaft, which is opposite from the one end portion of the countershaft.

* * * * *